(12) United States Patent　　(10) Patent No.: US 7,569,194 B2
Russell　　(45) Date of Patent: Aug. 4, 2009

(54) WASTE HEAT ENERGY RECOVERY METHOD AND SYSTEM

(75) Inventor: Thomas H. Russell, Tulsa, OK (US)

(73) Assignee: Thomas Russell, L.L.C., Tulsa, OK (US)

( * ) Notice: Subject to any disclaimer, the term of this patent is extended or adjusted under 35 U.S.C. 154(b) by 809 days.

(21) Appl. No.: 11/117,780

(22) Filed: Apr. 29, 2005

(65) Prior Publication Data

US 2008/0009405 A1　Jan. 10, 2008

(51) Int. Cl.
| F01N 3/10 | (2006.01) |
| B01D 47/00 | (2006.01) |
| B01D 53/46 | (2006.01) |
| B01D 53/56 | (2006.01) |
| B01D 53/14 | (2006.01) |
| C01B 17/16 | (2006.01) |
| C01B 31/20 | (2006.01) |
| B01J 38/04 | (2006.01) |
| B01J 38/06 | (2006.01) |
| B01J 38/02 | (2006.01) |
| B01J 38/00 | (2006.01) |

(52) U.S. Cl. .................. 422/173; 122/4 R; 423/210; 423/220; 423/226; 423/228; 502/20; 502/34; 502/55; 502/56

(58) Field of Classification Search .............. 122/4 R; 422/173; 423/210, 220, 226, 228; 502/20, 502/34, 55, 56

See application file for complete search history.

(56) References Cited

U.S. PATENT DOCUMENTS

| 1,783,901 | A |  | 12/1930 | Bottoms |  |
| 2,526,696 | A | * | 10/1950 | Schutte | 208/54 |
| 2,797,188 | A | * | 6/1957 | Taylor, Jr. et al. | 208/236 |
| 3,989,183 | A | * | 11/1976 | Gustafsson | 237/2 B |
| 4,019,866 | A |  | 4/1977 | Jaswal et al. |  |
| 4,213,448 | A |  | 7/1980 | Hebert |  |
| 4,380,615 | A |  | 4/1983 | Sauerbrunn |  |
| 4,389,383 | A |  | 6/1983 | Sokolik, Jr. et al. |  |
| 4,461,749 | A |  | 7/1984 | Thorn |  |
| 4,627,388 | A |  | 12/1986 | Buice |  |
| 5,735,936 | A |  | 4/1998 | Minkkinen et al. |  |
| 5,994,147 | A | * | 11/1999 | Rodriguez et al. | 436/163 |
| 6,071,484 | A |  | 6/2000 | Dingman, Jr. et al. |  |
| 6,294,135 | B1 |  | 9/2001 | Joo et al. |  |
| 6,607,585 | B2 |  | 8/2003 | Morrow |  |
| 6,655,322 | B1 |  | 12/2003 | Godwin et al. |  |
| 2008/0009405 | A1 | * | 1/2008 | Russell | 502/56 |

FOREIGN PATENT DOCUMENTS

JP　　55-140024　　1/1980

* cited by examiner

*Primary Examiner*—Jerry Lorengo
*Assistant Examiner*—Jennifer A Smith
(74) *Attorney, Agent, or Firm*—McAfee & Taft

(57) ABSTRACT

The current invention provides methods and apparatus for integrating a high temperature waste heat recovery system with a chemical or refining process which requires heat energy at a temperature less than the operational temperature of the waste heat recovery system. Additionally, the current invention provides methods and apparatus suitable for retrofitting existing process units requiring heat energy at a temperature of T2 with a waste heat recovery system operating at temperature of T1 where T1 is greater than T2.

7 Claims, 1 Drawing Sheet

WASTE HEAT ENERGY RECOVERY METHOD AND SYSTEM

FIELD OF THE INVENTION

The current invention improves the operational efficiencies of refineries and chemical plants by recovering waste heat from high temperature heat sources. The current invention provides for the utilization of the recovered waste heat in chemical and refining processes operating at temperatures less than the operational temperature of the waste heat recovery system.

BACKGROUND OF THE INVENTION

Modern chemical and petroleum refineries continually seek to recover and use waste heat energy from various operations in order to improve plant efficiencies and to lower costs. Unfortunately, temperature limitations of various process units in the plants preclude the use of waste heat generated by incinerators and other high temperature sources. For example, alkanolamine solutions, commonly used to remove acid gases from raw natural gas, begin to degrade when exposed to temperatures in excess of 325° F. Accordingly, the regeneration process must be closely monitored to ensure that temperature of the applied heat energy remains in the range of about 275° F. to about 350° F. As known to those skilled in the art, the temperature of the applied heat energy may range slightly above the degradation temperature of the alkanolamine solution in order to accommodate heat lost to the walls of the regeneration unit.

In a typical regeneration process, a "rich amine" (an alkanolamine solution containing large quantities of acid gases) is converted to a "lean amine" (an alkanolamine solution stripped of acid gases) in an amine still, also referred to as a stripper column. The amine still typically operates at a temperature of about 250° F. and a pressure of about 20 to 30 psig. Heat energy is applied to the amine still by directing the amine solution through a heat exchanger known as an amine reboiler. In view of the operational limits of the alkanolamine regeneration process, recovered waste heat from incinerators and other similar units is not currently used to heat the amine reboiler.

Thus, readily available sources of high temperature waste heat in acid gas treatment facilities such as, but not limited to, the sulfur incinerator, the BTEX incinerator and engine exhaust systems are not integrated with the alkanolamine regeneration process. The BTEX incineration converts natural gas contaminants such as benzene and alkylbenzenes to $CO_2$ and $H_2O$. Both the sulfur and BTEX incineration processes operate in excess of 1200° F. producing a high temperature vent gas. However, as noted above, use of the high temperature vent gas in the alkanolamine regeneration process is not currently practiced due to the temperature limitations imposed by the temperature sensitivity of the alkanolamine solution.

Steam is one preferred fluid for transporting heat energy to an amine reboiler or other similar heat exchange units. However, steam plants are not present in all refineries and chemical plants. In view of the expense to construct, operate and maintain a traditional steam plant, many operators prefer to use other heat sources for temperature sensitive solutions such as alkanolamines. However, such heat sources must provide even heating of the regeneration system or localized overheating will lead to degradation of the temperature sensitive solution solution.

Thus, there is a need for a method and system for recovering waste heat from a high temperature source, such as the BTEX incinerator, and using the recovered heat in a process that does not tolerate high temperatures, such as an alkanolamine regeneration process. The method and system must provide for the even application of heat energy to the regeneration system in order to preclude degradation of the solution being regenerated. Additionally, it would be desirable for the system to be suitable for retrofitting to currently existing processing units.

SUMMARY OF THE INVENTION

In one embodiment, the current invention provides a method for recovering waste heat for use in a temperature sensitive process requiring heat energy at a temperature no greater than T2. In particular, the method of the current invention recovers waste heat from high temperature units such as BTEX and sulfur incinerators for use in processes which cannot tolerate temperatures generated by such high temperature units. In the method of the current invention temperature T1 is greater than temperature T2. According to the method of the current invention, a first heat transfer fluid is heated to T1 by heat transfer from a waste heat source. Subsequently, a second heat transfer fluid is vaporized at temperature T2 by transfer of heat energy from the first heat transfer fluid to the second heat transfer fluid. Thereafter, heat energy is transferred to the temperature sensitive process by condensation of at least a portion of the vaporized second heat transfer fluid. Since condensation of the second heat transfer fluid occurs at a uniform temperature, the temperature sensitive process is provided with the requisite heat energy without exposure to detrimental temperatures and without accompanying deleterious effects. A preferred second heat transfer fluid is water.

In another embodiment, the current invention provides a method for regenerating a rich alkanolamine solution to a lean alkanolamine solution. In the method of the current invention, a heat transfer fluid passes through a heat exchanger positioned within the path of a gas having a temperature between about 800° F. and about 1600° F. The heat transfer fluid has a residence time within the heat exchanger sufficient to heat the heat transfer fluid to a temperature between about 400° F. and about 600° F. This heat transfer fluid subsequently flows to a waste heat vaporizer. Heat energy carried by the heat transfer fluid is transferred within the waste heat vaporizer to liquid water, converting the water to steam. The resulting steam has a temperature between about 275° F. and about 350° F. The steam subsequently flows to the alkanolamine regeneration unit where heat energy is transferred from the steam to the rich alkanolamine solution. Thereafter, the rich alkanolamine solution is regenerated to a lean alkanolamine solution.

Still further, the current invention provides an integrated system for transferring heat energy from a waste heat source to a processing unit. The integrated system comprises a waste heat transfer system and a closed hydrostatic flow system. The waste heat transfer system comprises a waste heat source such as an incinerator or stationary engine and a waste heat exchanger positioned in the path of a hot gas generated by the waste heat source. The waste heat exchanger is coupled to a first fluid circulation system providing fluid communication between the waste heat exchanger and the closed hydrostatic flow system. The fluid circulation system carries a heat transfer fluid. As the heat transfer fluid passes through the waste heat transfer system it is heated to a temperature of T1. The closed hydrostatic flow system of this embodiment comprises a waste heat vaporizer in fluid communication with the first fluid circulation system. The closed hydrostatic flow system includes a second fluid circulation system providing fluid communication between the waste heat vaporizer and the processing unit. The second fluid circulation system carries a second heat transfer fluid. The waste heat vaporizer transfers heat energy from the first heat transfer fluid to the second heat transfer fluid at a temperature T2. The heat energy carried by the second heat transfer fluid is provided to the processing unit as the second heat transfer fluid flows through the second fluid circulation system.

Still further, the current invention provides a method for retrofitting a processing unit requiring heat energy at a temperature equal to or less than T2 with a waste heat recovery system providing heat energy at a temperature T1 wherein T1 is greater than T2. The method of the current invention comprises the steps of providing a waste heat vaporizer in fluid communication with the processing unit. The fluid communication should be suitable for carrying steam at a temperature between about 275° F. and about 350° F. at a pressure of about 30 psig to about 65 psig. Additionally, the fluid communication between the processing unit and the waste heat vaporizer should provide for the transportation of condensed water from the processing unit to the waste heat vaporizer. Additionally, a heat exchanger is positioned within the path of a flowing gas produced by the high temperature waste heat source. The hot flowing gas has a temperature between about 800° F. and about 1600° F. Fluid communication is also provided between the waste heat vaporizer and the heat exchanger within the path of the hot gas. A heat transfer fluid passing through the heat exchanger is heated to a temperature of T1 and subsequently flows to the waste heat vaporizer. The waste heat vaporizer transfers heat energy from the heat transfer fluid to liquid water passing through the waste heat vaporizer producing steam at temperature T2. The resulting steam flows to the processing unit thereby providing heat energy at a temperature equal to or less than T2 to the processing unit.

DESCRIPTION OF THE PREFERRED EMBODIMENTS

Figure 1:
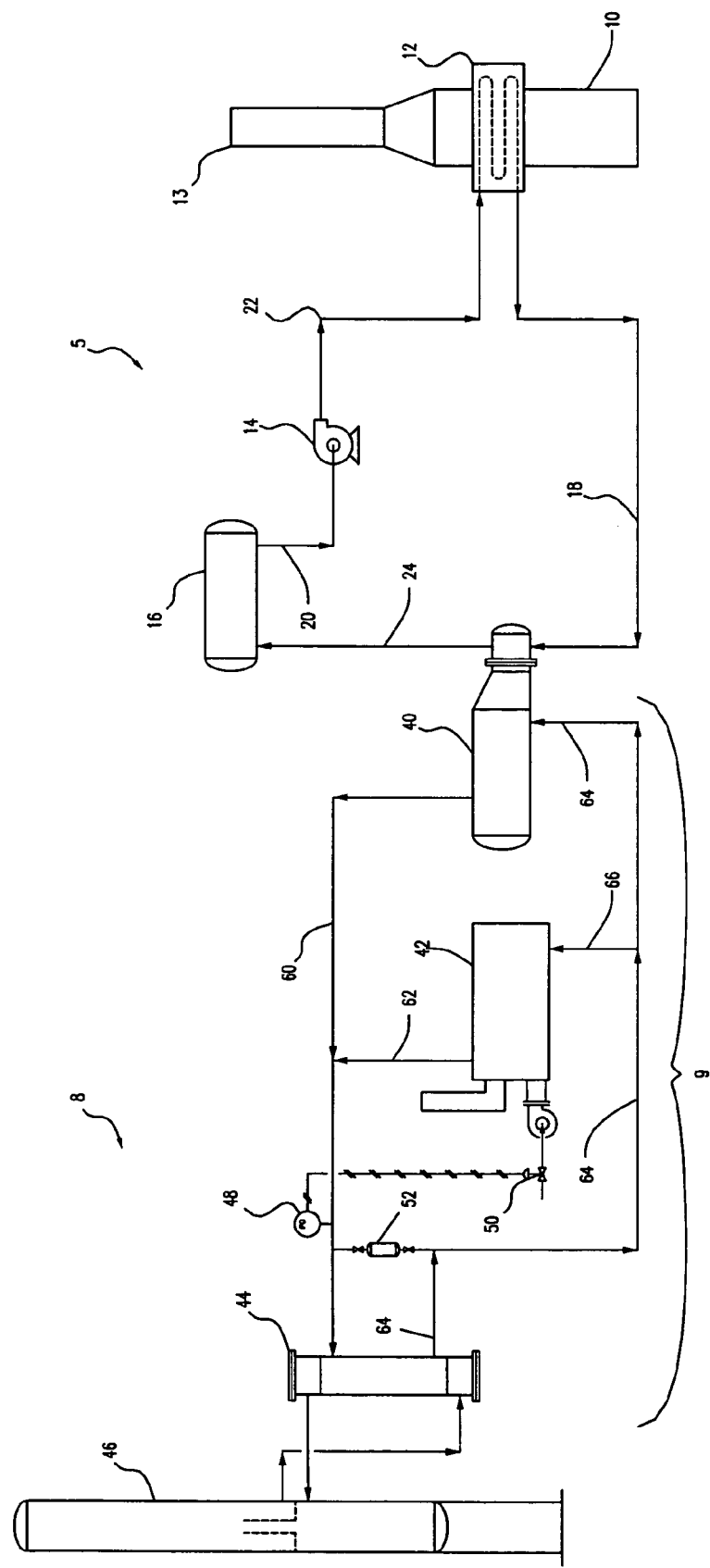
FIG. 1 depicts a preferred embodiment of the invention.

The present invention provides an efficient means for recovering waste heat from a high temperature waste heat source, such as an incinerator, and using the recovered heat energy in a chemical or refining process requiring heat energy at a temperature less than the temperature of the waste heat source. The current invention provides for the integration of a waste heat system with a chemical or refining system. Further, the current invention provides for the retrofit integration of an existing chemical or refining system with a waste heat system. While the current invention is suitable for use in many processes, for the sake of conciseness, the following description of one preferred embodiment will describe the application of the current invention in an alkanolamine regeneration process.

The method and apparatus of the current invention overcome the process temperature limitations of a temperature sensitive process such as an alkanolamine regeneration process. As noted above, regeneration of a rich alkanolamine solution to a lean alkanolamine solution includes a heating step wherein the alkanolamine solution must not exceed 325° F. The current invention provides for the use of a waste heat source operating at temperatures in excess of 800° F. in the alkanolamine regeneration process by integrating the waste heat recovery system 5 with the alkanolamine regeneration system 8.

Referring to FIG. 1, the waste heat recovery system 5 comprises an incinerator 10 or other waste heat source such as a Claus reactor or stationary engine (not shown), having a waste heat recovery exchanger 12, a pump 14 suitable for pumping a heat transfer fluid, an optional surge tank 16 and conduits 18, 20, 22 and 24. Conduits 18, 20, 22 and 24 provide for circulation of a heat transfer fluid through waste heat recovery system 5.

Waste heat recovery exchanger 12 may be any conventional waste heat exchanger. Optional surge tank 20 provides added flexibility to waste heat recovery system 5 by accommodating changes in temperature and pressure during operation of incinerator 10 and providing the ability to add make-up heat transfer fluid to waste heat recovery system 5. Pump 14 provides for continual flow of the heat transfer fluid through waste heat recovery system 5. Flow rates and operational temperature of the heat transfer fluid will be determined by each specific system's design requirements, generally the greater the temperature change of the heat transfer fluid, the less fluid circulation is required.

As shown in FIG. 1, waste heat transfer system 5 is integrated with alkanolamine regeneration system 8. In particular, waste heat transfer system 5 provides heat energy to alkanolamine regeneration system 8 through a waste heat vaporizer 40. Waste heat vaporizer 40 may be any conventional heat exchanger such as a kettle reboiler or other similar device. Additionally, alkanolamine regeneration system 8 comprises a supplemental steam boiler 42 (or other suitable steam source), an amine reboiler 44, an amine still 46, a steam pressure controller 48, an optional lubricator pot 52 and conduits 60, 62, 64, and 66. Steam boiler 42 and waste heat vaporizer 40 are located at a lower elevation than amine reboiler 44.

The preferred alkanolamine regeneration system 8 uses a closed hydrostatic flow system 9. Closed hydrostatic flow system 9 utilizes heat transfer fluids which are vaporizable and recondensable. In this embodiment, closed hydrostatic flow system 9 is a closed hydrostatic steam system which does not require make-up water and does not generate boiler blow-down. Closed hydrostatic flow steam system 9 comprises waste heat vaporizer 40, supplemental steam boiler 42 (or other suitable steam source), amine reboiler 44, steam pressure controller 48, optional lubricator pot 52 and conduits 60, 62, 64, and 66. Given the configuration of closed hydrostatic flow steam system 9, a pump is not required to generate flow of fluid through conduits 60, 62, 64, and 66. By eliminating the need for a pump, addition of make-up water is minimized and preferably eliminated. As a further advantage, closed hydrostatic steam system 9 does not produce boiler blowdown and requires minimal water treatment. Closed hydrostatic flow steam system 9 is suitable for use with all types of amine reboilers 44 including but not limited to kettle reboilers, horizontal shell and tube reboilers with steam condensing in the tubes or shell and vertical shell and tube reboilers with steam condensing on the shell side.

As is known to those skilled in the art, regeneration of rich alkanolamine solutions requires the use of an amine still 46 and amine reboiler 44. Since those skilled in the art are familiar with the apparatus and process for regenerating alkanolamines, the following detailed disclosure will focus on the methods and apparatus for conveying waste heat energy from waste heat transfer system 5 to reboiler 44 of alkanolamine regeneration system 8. While the following discussion continues with a focus on alkanolamine regeneration, the methods described herein will be suitable for any temperature sensitive process integrated with waste heat recovery system 5 operating at temperatures T1 in excess of the upper temperature limits T2 of the temperature sensitive process.

With continued reference to FIG. 1, in the preferred embodiment of the current invention, waste heat from incinerator 10 is transferred to a heat transfer fluid flowing through waste heat exchanger 12. Preferably, incinerator 10 operates at a temperature of about 800° F. to about 1600° F. When incinerator 10 is a BTEX or sulfur incinerator, it preferably operates between about 1200° F. and about 1400° F.

Heat transfer fluid housed in surge tank 16 is transferred by pump 14 through conduits 20 and 22 to waste heat exchanger 12. Preferably, the heat transfer fluid flows from surge tank 16 to waste heat exchanger 12 at a temperature in the range of about 300° F. to about 350° F. Since waste heat exchanger 12 is positioned in the path of the vent gas produced by incinerator 10, heat energy carried by the vent gas at a temperature between about 800° F. and 1600° F. is transferred to the heat transfer fluid passing through waste heat exchanger 12. As a result, the heat transfer fluid is heated to a temperature T1 while the vent gas is cooled. Heat transfer fluid residence time in heat exchanger 12 is sufficient to raise the temperature of the heat transfer fluid to a preferred range of about 400° F. to about 600° F. Preferably, the incinerator vent gas exits waste heat exchanger 12 at a temperature of 400° F. or higher. Vent gas temperatures lower than 400° F. may produce undesirable condensation of gas components leading to corrosion within stack 13 and precluding development of the lift necessary to carry the exhaust plume out of incinerator stack 13.

Heat transfer fluid at T1 flows through conduit 18 to waste heat vaporizer 40 and subsequently returns to surge tank 16 through conduit 24. Suitable first heat transfer fluids for use in waste heat recovery system 5 include, but are not limited to, mineral oil, diphenyls, modified terphenyls and polyalkalene glycols. Many of these fluids can operate at temperatures up to 600° F. Heat transfer liquids are commercially available under the trade names DOWTHERM® from Dow Chemical Company, MOBILTHERM® from Mobil Oil Corp., THERMINOL® from Solutia Inc., UCON® from Union Carbide, and numerous others.

As the heat transfer fluid in waste heat recovery system 5 passes through waste heat vaporizer 40, heat energy is transferred to a fluid contained within waste heat vaporizer 40. Preferably, the amount of heat transferred is sufficient to vaporize the fluid housed within waste heat vaporizer 40 at a temperature T2. When the fluid to be vaporized is water, T2 will be between about 275° F. and about 350° F. The temperature of vaporization T2 is less than T1. Following transfer of heat energy within waste heat vaporizer 40, heat transfer fluid at a temperature of about 300° F. to about 350° F. returns to surge tank 16 through conduit 24.

In alkanolamine regeneration system 8, the preferred fluid to be vaporized is water. Thus, in the preferred embodiment, the transfer of heat energy from incinerator 10 through heat exchanger 12 to the heat transfer fluid provides the heat energy necessary for alkanolamine regeneration. The heat transfer fluid carries the heat energy to waste heat vaporizer 40. In waste heat vaporizer 40, water is converted to saturated steam at temperature T2. Closed hydrostatic flow steam system 9 of the current invention may be used for any process requiring heat energy in the range of about 275° F. to about 350° F. Closed hydrostatic flow steam system 9 is particularly suited for applying heat energy to amine reboiler 44 as the saturated steam will necessarily have a temperature lower than the degradation temperature of the alkanolamines. Additionally, use of steam in amine reboiler 44 will ensure even heating of amine reboiler 44 precluding undesirable hot spots.

Typically, the saturated steam will have a temperature in the range of about 280° F. to about 320° F. In the preferred embodiment, the steam carried by conduit 60 is saturated steam at a temperature of about 300° F.

Closed hydrostatic flow steam system 9 operates at essentially a constant pressure. In the current embodiment, the operating steam pressure within conduits 60 and 62 is in the range of about 30 psig to about 125 psig when the system operates at temperatures between about 275° F. and about 350° F. When the system operates at 320° F., then the pressure will be about 75 psig. The preferred operating pressure of the saturated steam in conduits 60 and 62 is about 50 psig.

To aid in the flow of condensed water through conduits 64 and 66 of closed hydrostatic flow steam system 9, steam boiler 42 and waste heat vaporizer 40 are located at a lower elevation than amine reboiler 44. The physical arrangement of steam boiler 42, waste heat vaporizer 40 and amine reboiler 44 generates sufficient hydrostatic head to permit the condensed water in conduits 64 and 66 to overcome the system pressure drop in amine reboiler 44, steam boiler 42 and waste heat vaporizer 40 thereby eliminating the need for a pump in alkanolamine regeneration system 8.

In order to maintain a constant pressure, steam boiler 42 provides supplemental steam to be combined with the steam generated by waste heat vaporizer 40. Supplemental steam from steam boiler 42 flows through conduit 62 to combine with steam from waste heat vaporizer 40 in conduit 60. Since closed hydrostatic flow steam system 9 operates at a constant pressure, the addition of supplemental steam by steam boiler 42 is controlled by pressure sensor 48 and added on an as needed basis. If pressure within conduit 60 drops below a predetermined operating pressure, then sensor 48 will direct fuel controller 50 to supply additional fuel to steam boiler 42. As fuel is added to steam boiler 42, additional steam is generated and carried by conduit 62 to conduit 60.

The combination of saturated steam from waste heat vaporizer 40 and steam boiler 42 flows through conduit 60 into amine reboiler 44. As the steam enters amine reboiler 44 it condenses thereby transferring heat energy to amine reboiler 44 at a temperature between about 275° F. and about 350° F. Preferably, heat energy at a temperature of about 300° F. is applied to amine reboiler 44. As noted above, some heat energy is lost to the walls of the amine reboiler 44 or any other heat exchanger. Accordingly, applying heat energy at a temperature of about 350° F. to amine reboiler 44 does not necessarily degrade the alkanolamine solution. The condensed water exits reboiler 44 entering conduit 64 and flows by gravity back to steam boiler 42 and waste heat vaporizer 40. Thus, the current invention provides an alkanolamine regeneration system 8 which utilizes closed hydrostatic flow steam system 9 suitable for providing heat energy to amine reboiler 44 integrated with waste heat recovery system 5.

Closed hydrostatic steam system 9 requires minimal water treatment to preclude corrosion and formation of scale. To the degree water treatment is needed, an oxygen scavenging chemical is maintained in the closed steam system by use of a lubricator pot 52. Typically, a sufficient quantity of oxygen scavenging chemical is initially added to closed hydrostatic flow steam system 9. Subsequent addition of oxygen scavenging chemical is minimal.

As previously indicated, the current invention is suitable for retrofitting currently existing chemical or refining units. When retrofitting a unit (not shown) currently using a steam boiler to provide heat energy at temperature T2, the current invention comprises the steps of adding waste heat vaporizer 40. Waste heat vaporizer 40 is subsequently added to the existing steam system (not shown) in a manner similar to that depicted in FIG. 1. Additionally, waste heat vaporizer 40 is integrated into waste heat recovery system 5 as depicted in FIG. 1. As previously discussed, waste heat vaporizer 40 transfers heat energy at T1 from waste heat recovery system 5 to the retrofitted unit by converting water to steam at T2. While the closed hydrostatic flow steam system 9 described above has clear advantages over other steam systems, this embodiment of the current invention is suitable for retrofitting any conventional steam system.

The current invention also provides a method for retrofitting temperature sensitive chemical or refining units (not shown) requiring heat energy at T2 but not currently using steam. As previously noted, steam plants are expensive to build and maintain. Therefore, if steam is not required for other processing units some plants will use alternative heat sources for temperature sensitive processes. However, the current invention improves the operating efficiencies of a plant by recapturing waste heat energy normally vented to the atmosphere. Thus, in this embodiment of the current invention, a processing unit requiring heat energy is retrofitted with a closed hydrostatic flow system, as described above. The closed hydrostatic flow system is integrated with waste heat recovery system 5. The integrated systems provide for the transfer of heat energy at T1 to the temperature sensitive process unit at temperature T2. The closed hydrostatic flow system may utilize water as the vaporizable fluid or may utilize another suitable vaporizable and recondensable fluid.

The current invention has been described in detail with regard to the integration of waste heat recovery system 5 with an alkanolamine regeneration system 8. However, the current invention will be equally applicable to other refinery or chemical process units when the refinery or chemical process units require heat energy at a temperature T2 that is less than the operational temperature T1 of an available waste heat source. Other embodiments of the methods and apparatus for performing the current invention will be apparent to those skilled in the art. Therefore, the foregoing specification is considered exemplary with the true scope and spirit of the invention being indicated by the following claims.

What is claimed is:

1. An integrated system for transferring heat energy from a waste heat source to a processing unit comprising:
    a waste heat transfer system and a pump free closed hydrostatic flow system;
    said waste heat transfer system comprising:
        a waste heat source;
        a waste heat exchanger;
        a first fluid circulation system providing fluid communication between said waste heat exchanger and said pump free closed hydrostatic flow system:
        a heat transfer fluid carried within said first fluid circulation system;
    said pump free closed hydrostatic flow system comprising:
        a waste heat vaporizer in fluid communication with the first fluid circulation system;
        a second fluid circulation system providing fluid communication between said waste heat vaporizer and said processing unit;
        a second heat transfer fluid carried within said second fluid circulation system of said pump free closed hydrostatic flow system;
        said waste heat vaporizer transfers heat energy from said waste heat transfer system to said pump free closed hydrostatic flow system and said processing unit.

2. The integrated system of claim 1, wherein said second heat transfer fluid is water and said pump free closed hydrostatic flow system is a pump free closed hydrostatic flow steam system further comprising a supplemental source of steam.

3. The integrated system of claim 1, wherein said processing unit is an alkanolamine regeneration unit comprising an amine reboiler and an amine still and wherein said waste heat vaporizer is positioned at an elevation lower than said amine reboiler.

4. An integrated system for recovering heat energy at a temperature T1 from a high temperature waste heat source and transferring the recovered heat energy to a processing unit operating at a temperature T2 said system comprising:
    a waste heat transfer system comprising:
        a high temperature waste heat source;
        a heat exchanger;
        a heat transfer fluid;
    a pump free closed hydrostatic flow steam system comprising:
        water;
        a waste heat vaporizer; and,
        a heat exchanger.

5. The integrated system of claim 4, where said waste heat vaporizer transfers heat energy from said waste heat transfer system to said pump free closed hydrostatic flow steam system and said processing unit, wherein the temperature of the heat energy from said waste heat vaporizer is T1 and the temperature of the heat energy transferred to said processing unit is T2.

6. The integrated system of claim 4, further comprising a supplemental steam boiler.

7. The integrated system of claim 6, wherein said processing unit is an alkanolamine regeneration unit comprising an amine still and wherein said heat exchanger of said pump free closed hydrostatic flow steam system is an amine reboiler and wherein said waste heat vaporizer and said supplemental steam boiler are located at an elevation lower than said amine reboiler.

* * * * *